United States Patent Office 3,466,252
Patented Sept. 9, 1969

3,466,252
POLYURETHANE RESINS DERIVED FROM POLYOXYALKYLATED ARYLATED CARBOHYDRATES AND METHOD OF MAKING THE SAME
Helmut F. Prahl, Middleton, and Frederick M. Hart, Madison, Wis., assignors to Department of Agriculture and Inspection of the State of Nebraska, Lincoln, Nebr., a corporation of Nebraska
No Drawing. Filed Feb. 21, 1964, Ser. No. 346,408
Int. Cl. C08g 22/14, 22/16, 22/44
U.S. Cl. 260—2.5        2 Claims

ABSTRACT OF THE DISCLOSURE

Polyurethane foams using as the polyether component alkoxylated dixylo glucitol have less shrinkage.

---

This invention generally relates to condensation products of arylated sugars and alkylene oxides and methods of making arylated polyethers.

By reacting arylated sugars and alkylene oxides under suitable conditions it is possible to form a polyether sugar product which may be effectively utilized in place of known polyethers especially in providing an improved synthetic foam having low density, low thermal conductivity, high strength and rigidity, and excellent color. The arylated polyether sugars of the present invention are condensation products which are produced by the reaction of the hydroxyl components of the sugar radical with the alkylene oxides. The arylated polyether sugars are preferably hydroxyl-rich materials such that they will react with polyisocyanates to provide the arylated polyurethane sugars of the present invention.

Therefore, it is an object of the present invention to provide a method of manufacturing an arylated polyether sugar.

It is another object of the present invention to provide an arylated polyether sugar.

It is still another object of the present invention to provide an arylated polyurethane sugar.

It is still a further object of the present invention to provide an arylated polyurethane sugar foam.

It is a further object of the present invention to provide a method of manufacturing an arylated polyether sugar by reacting an arylated sugar with an alkylene oxide to form ether components with the sugar component of the arylated sugar.

It is still a further object of the present invention to provide a polyether reaction product of arylated sugar and alkylene oxide with the ether radicals being substituted for the hydroxyl sugar radicals.

It is still another object of the present invention to provide aryl-substituted-desoxy-polyether-alditols by the reaction of an aryl-substituted-desoxy-alditol with an alkylene oxide.

It is still another object of the present invention to provide diaryl-substituted-desoxy-polyether - alditols and kititols from the reaction of diaryl-substituted desoxy-alditols and ketitols with an alkylene oxide.

It is still another object of the present invention to provide a xylo-desoxy-polyether-glucitol by reacting xylo-desoxy-glucitol with an alkylene oxide.

It is still further an object of the present invention to provide aryl-desoxy-polyurethane-alditols and kititols.

It is still another object of the present invention to provide a method of forming the condensation produce of a xylo-desoxy-polyurethane-glucitol.

It is further another object of the present invention to provide a dixylo-desoxy-pentaurethane-glucitol and the method of forming said resin.

Other objects, features, and advantages of the present invention will become apparent from the following description and appended claims.

The various polyethers to which the present invention is directed may be generally termed as arylated-ether-alditols and ketitols which are formed by reacting an arylated alditol and ketitol with an alkylene oxide. The arylated ether alditols and ketitols are Linn-type arylated sugars formed by reacting a sugar compound with an aryl compound in the presence of a suitable catalyst.

The arylated sugar itself may be prepared from the desired aryl compound and any large variety of carbohydrates, especially cellulose, starch, and agricultural wastes, via the hydrogen fluoride condensation technique of the Linn-type arylation such as dixyloglucitol which is a condensation product of glucose, cellulose, or starch with o-xylene. Also, the sugar compound includes simple sugars, their desoxy and omega-carboxy derivatives, compound sugars or oligosaccharides, and polysaccharides. Simple sugars include diose, trioses, tetroses, pentoses, hexoses, heptoses, octoses, nonoses, and decoses. Compound sugars include disaccharides, trisaccharides, and tetrasaccharides. Polysaccharides include polysaccharides composed of only one type of sugar residue, polysaccharides composed of more than one type of sugar unit, polysaccharides composed of one type of uronic acid unit, i.e. polyuronides, polysaccharides comprised of aldose (pentose or hexose) and uronic acid units, polysaccharides containing hexose units esterified with an inorganic acid, and polysaccharides containing amino sugar units.

Utilizable simple sugars include the diose, glycolaldehyde; trioses, such as glyceraldehyde and s-dihydroxyacetone; tetroses, such as erythrose, threose, erythrulose, and apiose; the pentoses such as arabinose, xylose, ribose, lyxose, rhamnose (a desoxyhexose), fucose (a desoxyhexose), rhodeose digitalose, and ketoxylose; the hexoses, such as mannose, glucose, idose, gulose, gallactose, talose, allose, altrose, fructose, sorbose, tagatose, and psicose; heptoses such as glucoheptose, mannoheptose, galactohextose, sedoheptose, mannokstoheptose, glucoheptulose, and perseulose; octoses such as glucooctose, manooctose, and gallactooctose; nonoses such as glucononose, and mannononose; and decoses such as glucodecose. Desoxy derivatives of simple sugars are formed by the replacement of a hydroxyl substituent in a sugar with hydrogen thereby forming a methyl or methylene linkage. The desoxypentoses and desoxyhexoses are the most commonly occurring of such compounds. The omega-carboxy derivatives of simple sugars, which are suitable in the process of the present invention include tartronic semialdehyde or its tautomer, hydroxypyruvic acid, a,γ-dihydroxyacetoacetic acid, threuronic acid, 4-keto-2,3,5-trihydroxypentanoic acid, xyluronic acid, 5-keto-hexanoic acids such as 5-keto-allonic acid, 5-keto-gluconic acid, 5-ketomannonic acid, 5-ketogulonic acid, and 5-ketogallactonic acid, uronic acids such as glucouronic acid, mannuronic acid and gallacturonic acid, and the 6-keto-heptanoic acids. The simple sugars and their omega-carboxy derivatives, as starting materials for the process of this invention, may be represented by the following general formula:

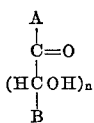

in which A=H and CH$_2$OH, $n=$an integer from 1 to about 12 or so, and B=H, CH$_2$OH, and COOH. As an example of the utility of this general formula when A=H, $n=1$, and B=H, the compound is glycolaldehyde; when A=H, $n=1$, and B=CH$_2$OH, the compound is glyceraldehyde; when A=H, $n=1$, and B=COOH, the compound is tartaronic semialdehyde, a tautomer of hydroxypyruvic acid; when A=CH$_2$OH, $n=1$ and B=H, the compound is s-dihydroxyactone; when A=CH$_2$OH, $n=1$, and B=CH$_2$OH, the compound is erythrulose; when A=CH$_2$OH, $n=1$, and B=COOH, the compound is a,$\gamma$-dihydroxyacetoacetic acid; when A=H, $n=2$, and B=CH$_2$OH, the compound is erythrose, or threose; when A=H, $n=2$, and B=COOH, the compound is threuronic acid; when A=CH$_2$OH, $n=2$, and B=CH$_2$OH, the compound is riboketose, or xyloketose; when A=CH$_2$OH, $n=2$, and B=COOH, the compound is 4-keto-2,3,5-trihydroxypentanoic acid; when A=H, $n=3$ and B=CH$_2$OH, the compound is ribose, arabinose, xylose, or lyxose; when A=H, $n=3$, and B=COOH, the compound is xyluronic acid; when A=CH$_2$OH, $n=3$, and B=CH$_2$OH, the compound is psicose, fructose, sorbose, or tagatose; when A=CH$_2$OH, $n=3$ and B=COOH, the compound is 5-ketohexanoic acid; when A=H, $n=4$, and B=CH$_2$OH, the compound is allose, altrose, glucose, mannose, gulose, idose, gallactose, or talos; when A=H, $n=4$, and B=COOH, the compound is a uronic acid; when A=CH$_2$OH, $n=4$, and B=CH$_2$OH, the compounds are heptoses, and when A=CH$_2$OH, $n=4$, and B=COOH, the compounds are 6-ketoheptanoic acids.

The utilizable oligosaccharides or compound sugars include disaccharides such as the pentose-hexose saccharides including glucoapiose, vicianose, and primeverose; the methylpentose-hexose saccharides including glycorhamnoside, and rutinose; and the dihexoses such as turanose, maltose, lactose, cellobiose, gentiobiose, melibiose, sucrose, and trehalose. Other compound sugars are represented by trisaccharides such as the methylpentosehexose saccharides including rhamninose, and robinose; the trihexose saccharides such as mannotriose; and the trihexoses including raffinose, melezitose, and gentianose. An example of a suitable tetrasaccharide is stachyose.

Various polysaccharides are also utilizable in the process of the present invention. These polysaccharides include pentosans such as araban, methylpentosans such as fugosan, the hexosans, such as starch, cellulose, glycogen, inulin, mannan, galactan, lichenin, levan, dextran, and laminarin. All of the above polysaccharides are composed of one type of sugar residue. Other polysaccharides which are composed of more than one type of sugar unit such as the pentosans, like araboxylan and the hexosans like galactomannan may be used. Other utilizable polysaccharides are represented by those composed of uronic acid units such as pectic acid and alginic acid; those composed of aldose (pentose or hexose) and uronic acid units such as gum arabic, damson gum, gum tragacanth, linseed mucilage, pectins, and those containing hexose units esterified with an inorganic acid such as certain seaweed polysaccharides like agar.

Suitable utilizable aromatic hydrocarbons include benzene, toluene, o-xylene, m-xylene, p-xylene, ethylbenzene, 1,2,3-trimethylbenzene, 1,2,4-trimethylbenzene, 1,3,5-trimethylbenzene or mesitylene, ortho-ethyltoluene, meta-ethyltoluene, p-ethyltoluene, n-propylbenzene, isopropylbenzene or cumene, etc. Higher molecular weight alkylaromatic hydrocarbons are also suitable such as those produced by the alkylation of aromatic hydrocarbons with olefinic polymers.

The alkylaromatic hydrocarbons may be formed by alkylating benzene, toluene, and other mononuclear and polynuclear aromatic hydrocarbons with olefinic hydrocarbons containing from about 9 to about 24 carbon atoms. Suitable olefins for this alkylation treatment as in the presence of hydrofluoric acid, sulfuric acid, etc. comprise polymers of propylene, butylene, etc. and particularly the polymers of propylene such as the trimer, tetramer, pentamer, hexamer and higher molecular weight polymers of said propylene.

Other suitable utilizable aromatic hydrocarbons include those containing an unsaturated side chain such as styrene, vinyltoluene, etc.

Other suitable utilizable aromatic hydrocarbons include those with two or more aryl groups such as diphenyl, diphenylmethane, triphenylmethane, fluorene, stilbene, etc. Examples of suitable utilizable hydrocarbons which contain condensed benzene rings include naphthalene, anthracene, phenanthrene, naphthacene rubene, alkylated aphthalene, arylated anthracenes and the like.

In addition to aromatic hydrocarbons, halo-aromatic compounds are also utilizable in the process of the present invention. Typical haloaromatic compounds utilizable as starting materials within the scope of this invention include

| | |
|---|---|
| fluorobenzene, | para-chloroethylbenzene, |
| chlorobenzene, | orthodichlorobenzene, |
| bromobenzene, | para-dichlorobenzene, |
| iodobenzene, | 1,2,4-trichlorobenzene, |
| ortho-chlorotoluene, | para-dibromobenzene, |
| meta-chlorotoluene, | ortho-bromochlorobenzene, |
| para-chlorotoluene, | para-bromochlorobenzene, |
| ortho-bromotoluene, | alpha-chloronaphthalene, |
| meta-bromotoluene, | beta-chloronaphthalene, |
| para-bromotoluene, | alpha-bromonaphthalene, |
| ortho-chloroethylbenzene, | etc. |
| meta-chloroethylbenzene, | |

As shown in prior patents of Carl B. Linn, such as U.S. Patent No. 2,798,098, the condensation of the aromatic hydrocarbon with the sugar results in an arylated sugar in which the aromatic hydrocarbon is attached to the sugar by means of a direct carbon to carbon bond.

The reaction between an arylated sugar and an alkylene oxide may be formulated as follows:

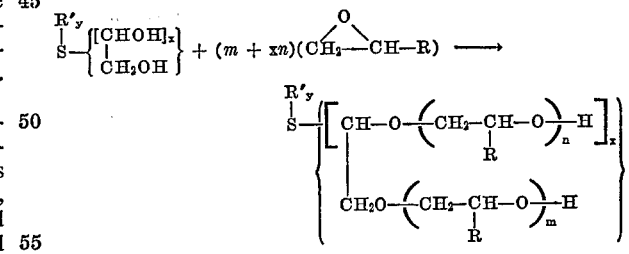

R' is any of the above mentioned aryl compounds with y being 1 to 3; S is any of the above mentioned sugars with the

portion representing the reactive hydroxyl portion of the sugars: R is H, or a C$_1$ to C$_4$ alkyl group, and $(m+xn)$ may be great as 2–200 but is generally 8–20 and is preferably between 10–16.

The condensation reaction of the arylated sugars and alkylene oxide may be carried out either with an acidic catalyst i.e. BR$_3$, HF, H$_2$SO$_4$, SnCl$_2$, AlCl$_3$, etc. or with a basic catalyst i.e. NaOCH$_3$, NaOH, NaH, Na$_2$CO$_3$, NaOOCCH$_3$, etc. Depending upon the catalyst used the reaction may be carried out at temperatures of 20 to 200° C. The acidic reactions are faster and thus with propylene oxide may be performed at room temperature. The basic reactions and those with ethylene oxide are preferably run in an autoclave.

The nature of this invention is illustrated further by the following examples, which, however, are not intended to limit the generally broad scope of the invention. The following examples illustrate the reaction of a representative sugar, dixyloglucitol, with representative alkylene oxides, ethylene oxide and propylene oxide, to provide a dixylo-polyether-glucitol. The reaction is illustrated in the following reaction as such

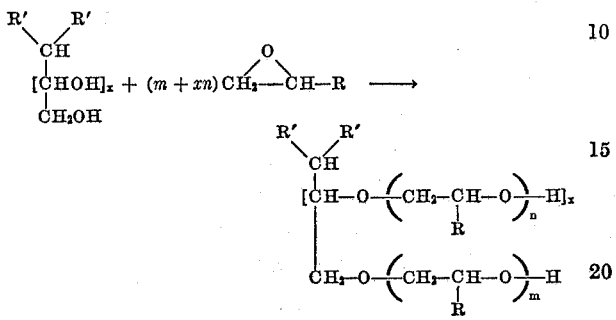

where

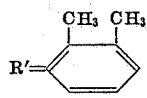

R=H or a $C_1$–$C_4$ alkyl group and $x=4$.

A hydroxyl number for the aryl-desoxy-polyetherglucitol is determined by ASTM Test D1638, Method B. This method essentially determines the percentage of terminal hydroxyl groups per molecule. Since this percentage decreases with increasing ratio of propylene oxide to dixyloglucitol, the latter may be calculated from the former.

According to this method, the polyether sample is treated with 25 ml. of a phthalating reagent prepared by adding 42.0 g. of phthalic anhydride to 300 ml. of freshly distilled pyridine. Treatment is for 1 hour at 115° C.±2° C. with loss of pyridine prevented by a reflux condenser. The solution is cooled, 15 ml. of pyridine are added, and it is titrated with 0.5 N NaOH to phenolphthalein. A blank is run in the same manner with, of course, the polyether omitted. The hydroxyl number, which is the number of milligrams of KOH which are equivalent in hydroxyl content to 1 g. of sample is given by $$\frac{(B-A)N \times 56.1}{W}$$

where A=NaOH titer of sample; B=NaOH titer of blank;
N=normality of NaOH; and W=sample weight. The hydroxyl number may then be converted to a propylene oxide/substrate ratio of desired.

Example I

A three-necked flask equipped with a reflux condenser, a stirrer and a dropping funnel was charged with 50.0 g. of doubly recrystallized dixyloglucitol and 95.6 g. of propylene oxide. A mixture of 5.5 ml. of $BF_3$ etherate and 50 ml. of anhydrous ether was placed in the dropping funnel. The reaction was then warmed to reflux with stirring and the catalyst was added in portions of 5–10 ml. over a period of 36 hours. At the end of this period all of the dixyloglucitol had reacted and the product was a clear, yellow viscous liquid.

The product was taken up into ether, washed with water to remove catalyst and polyoxypropylene homopolymer, dried and recovered from solution. The product amounted to 112 g. and had a viscosity of 9,200 cp. at 25° C. Analysis of the product by ASTM Test D1638, Method B, yielded a hydroxyl number of 255 from which it may be calculated that it contains 12.5 moles of propylene oxide per mole of dixyloglucitol.

Example II

The experimental equipment was similar to that described for Example I. The flask was charged with 25.0 g. of doubly recrystallized dixyloglucitol and 40 ml. of a 2 N solution of hydrogen fluoride in ether. 56.5 g. of propylene oxide were placed in the dropping funnel and thence added to the reaction, with stirring but without external heat, at such a rate that a smooth but vigorous reaction occurred at reflux. This required about 2 hours after which external heat was supplied for another 22 hours. At this point all of the dixyloglucitol had reacted and the reacting was a yellow, clear, viscous liquid.

The product was freed from polyoxypropylene homopolymer as before and found to amount to 52.3 g. The viscosity was 16,200 cps. at 25° C. Analysis by ASTM Test D 1638, method B, showed a hydroxyl number of 212 which converts to 16.5 mols of propylene oxide per mole of dixyloglucitol.

Example III

Carried out identically to Example II except that the propylene oxide was increased to 76.5 g.

The product amounted to 70.2 g. and had a viscosity of 3,900 cp. at 25° C. Analysis showed the propylene oxide/dixyloglucitol ratio to be 18.3.

Example IV

A pressure vessel was charged with 10.0 g. of dixyloglucitol, 27.9 g. of propylene oxide and 0.524 g. of sodium methoxide. The vessel was sealed and heated to 135° C. for 6½ hours. After cooling, the vessel was opened and found to contain a viscous, yellow, clear liquid which was freed from polyoxypropylene homopolymer in the usual manner.

The product polyether amounted to 21.3 g., had a viscosity was 16,200 cp. at 25° C. Analysis by ASTEM found to have a hydroxyl number of 225 corresponding to a propylene oxide/dixyloglucitol ratio of 15.0.

The above diaryl-desoxy-polyether-glucitol may be used in various fields as a solvent or reaction product and is utilized to form a polyurethane resin and preferably a diaryl-desoxy-polyurethane-glucitol foam. The diaryl-desoxy-polyurethane-glucitol foam is formed either by the prepolymer system or the one-shot system. In the prepolymer system, the diaryl-desoxy-polyether-glucitol is mixed anhydrously with an isocyanate and no foaming occurs. The foaming is accomplished at a future time and at a different location if desired by the addition of suitable organic or inorganic catalyst and blowing agents to produce the reaction. In the one-shot system the isocyanate and the diaryl-desoxy-polyether-glucitol, catalyst and blowing agents are all mixed together and a foam is produced immediately. The catalysts and blowing agents for the reaction are any of the well known catalyst and blowing agents utilized in the process of forming the known urethane foams. Blowing can be by carbon dioxide gas generated by the reaction of water on the polyisocyanate and also by mechanical blowing through the use of a low boiling liquid such as fluorinated hydrocarbon.

Example V 50 gm. of a dixylo-desoxy-polyether-glucitol made in accordance with any of Example I–IV, and having a hydroxyl number of 287 were mixed with 11.2 g. of fluorotrichloromethane and 1.5 g. of a silicone oil. To this mixture were added 24.4 g. of toluene diisocyanate, and, after homogenization by stirring, 0.50 g. of N-methyl morpholine. The foam rose spontaneously over a period of 5–15 minutes and after this period was ovencured at 70° C. for 6 hours. The density of the foam was 2.6 lbs./cut. ft.

It is of course understood that the above examples are sugar compounds mentioned herein may be substituted in the above examples for the dixyloglucitol utilized therein.

It is further understood that the above examples are for illustrative purposes only and that modifications may be made without departing from the inventive concepts of the present invention and that we intend the scope of the present invention to be set forth by the hereunto appended claims.

We claim as our invention:

1. A polyurethane resin foam comprising the foamed reaction product of a dixylo-desoxy-polyether glucitol and toluene diisocyanate produced in the presence of a catalyst and a blowing agent, said dixylo-desoxy-polyether glucitol being the condensation product of dixylo glucitol with from 8 to 20 molecular proportions of an alkylene oxide selected from the group consisting of ethylene oxide and propylene oxide in the presence of a catalyst at a temperature of from 20 to 200° C., whereby ether linkages are produced between said dixylo glucitol and said alkylene oxide.

2. The resin foam of claim 1 in which said alkylene oxide is propylene oxide.

References Cited

UNITED STATES PATENTS

| | | | |
|---|---|---|---|
| 2,909,539 | 10/1959 | Linn | 260—611 |
| 3,061,497 | 10/1962 | Wilson | 260—77.8 |
| 3,054,760 | 9/1962 | Worsley | 260—77.5 |
| 3,073,788 | 1/1963 | Hostettler et al. | 260—2.5 |
| 3,075,928 | 1/1963 | Lanham | 260—2.5 |
| 3,128,314 | 4/1964 | Shen et al. | 260—611 |
| 3,186,951 | 6/1965 | De Groote et al. | 252—331 |

FOREIGN PATENTS 956,586  4/1964  Great Britain.

OTHER REFERENCES

Gaylord Polyesters, Part II, Polyalkylene Oxides and other Polyesters, copyright 1963, pp. 224–225, 235, 236 and 237. Interscience Publishers, New York.

German printed application No. 1,125,168, 1962, Merten et al.

HOSEA E. TAYLOR, JR., Primary Examiner

MICHAEL B. FEIN, Assistant Examiner

U.S. Cl. X.R.

260—77.5, 209, 233.3, 615